(No Model.)
E. R. DE WOLFE.
RUBBER TIRE FOR BICYCLES.
No. 471,813. Patented Mar. 29, 1892.
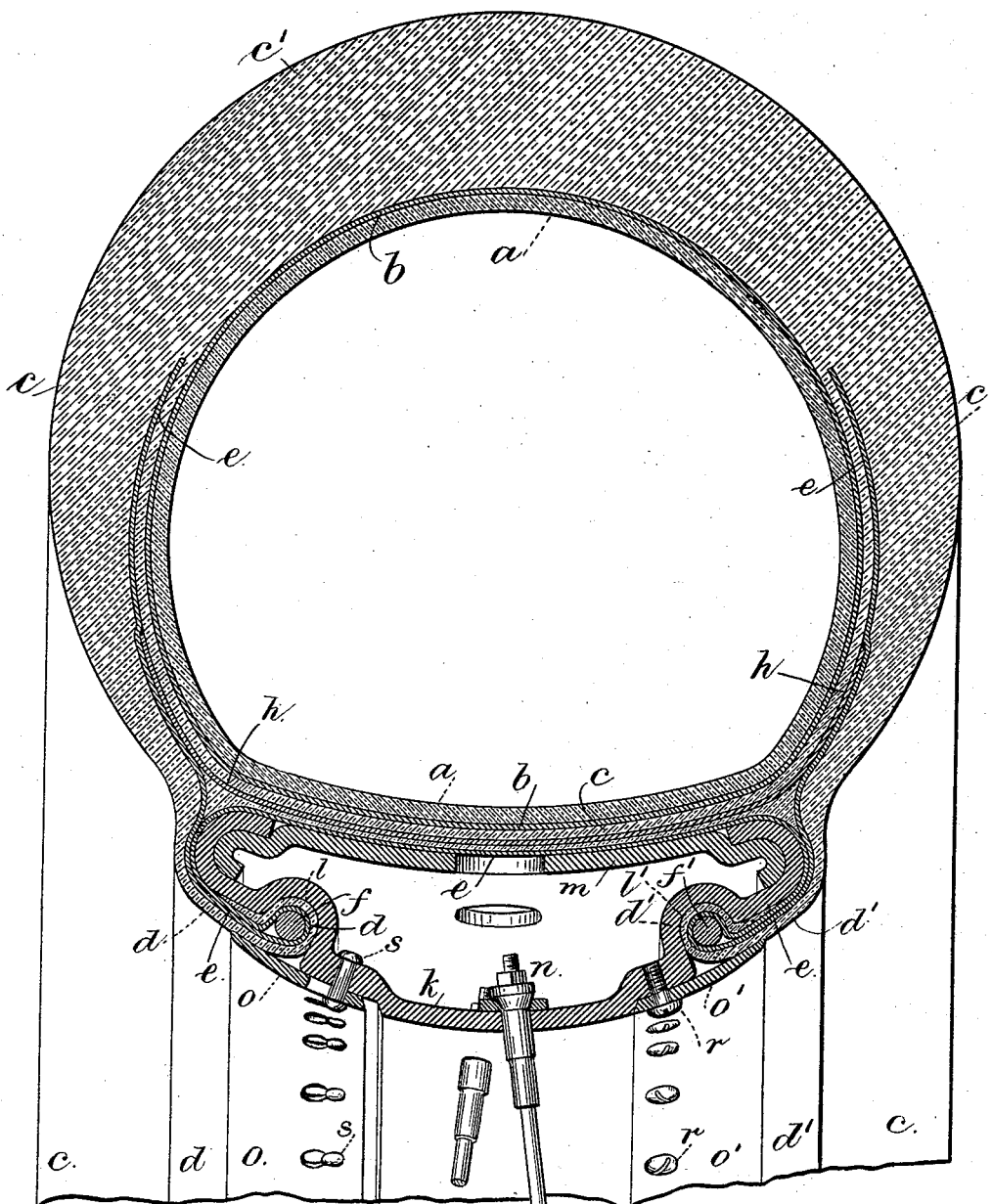
Witnesses
Chas H. Smith
J. Staib
Inventor
Edward R. De Wolfe
per Lemuel W. Serrell
atty

UNITED STATES PATENT OFFICE.

EDWARD R. DE WOLFE, OF NEW YORK, N. Y., ASSIGNOR TO HIMSELF AND GEORGE R. BIDWELL, OF SAME PLACE.

RUBBER TIRE FOR BICYCLES.

SPECIFICATION forming part of Letters Patent No. 471,813, dated March 29, 1892.

Application filed July 2, 1891. Serial No. 398,263. (No model.)

*To all whom it may concern:*

Be it known that I, EDWARD R. DE WOLFE, a citizen of the United States, residing at the city, county, and State of New York, have invented a new and useful Improvement in Rubber Tires for Bicycles and other Vehicles, of which the following is a specification.

My invention relates to that class of rubber tires for bicycles and other similar vehicles known as "pneumatic" or "inflatable" tires, the same being filled with air under pressure, the pressure being sustained by an air-valve, but being releasable. Heretofore with tires of this character in use if a broken spoke had to be replaced or if the rim or felly of the wheel became damaged it was necessary to take the tire and its wrapped connection to the felly completely to pieces to repair the damaged part. This was tedious and expensive work, which not only involved the repair of the damaged part, but the rebuilding of the tire to the felly.

My invention consists in a pneumatic or inflatable rubber and fabric tire of peculiar construction and a hollow metal felly to which such tire is removably secured and clamped.

My improved tire is made with integral flanges having cores, and my felly with grooves in the inner face to receive said flanges, and clamping-rings are secured to the felly and retain the flanges firmly in place.

In the drawing I have illustrated my improvement by an enlarged cross-section of the tire and rim.

$a$ represents the complete inner rubber tube; $b$, a seamless inclosing sleeve of woven or knitted fabric entirely surrounding the tube $a$, and outside of these is the tubular rubber covering $c$, having a thickened tread portion $c'$. This latter is the outer portion that comes in contact with the ground and is made thicker than the back portions for the purpose of greater wear and elasticity, as well as strength. The back portions of the covering $c$ are continued to form flanges $d\ d'$, which flanges are made by the thin ends of the covering $c$ and a doubling or loop of fabric formed from the strip of fabric $e$, which together inclose the cores or wires $f\ f'$. The strip of fabric $h$ occupies the lower or inner portion of the inflatable tire adjacent to the outer face of the felly, and the strip of fabric $e$ extends around the outer face of the hollow rim and around the cores $f\ f'$ and back upon itself and up the sides of the covering $c$ to a point above the ends of the strip $h$; but it does not encircle the inflatable tire as the sleeve $b$ does.

The rim or felly is preferably made with an inner convex plate $k$, in which is formed two depressions or circumferential grooves $l\ l'$, and with a slightly-concave outer face-plate $m$, and these two plates are connected to form the hollow rim by curved interlocking edges, which are to be brazed together to rigidly connect the parts, and there are openings in the plate $m$ for the introduction of the spoke nipples and washers shown at $n$. Clamping-rings $o\ o'$ are employed, as hereinafter more fully described.

My improved inflatable tire is built up of the parts $a\ b$, $c\ c'$, $h\ e$, $d\ d'$, and $f\ f'$ in about the order named upon a circular form agreeing with but slightly smaller than the hollow rim or felly.

In the process of making up the tire the fabric portion $b$ is cemented or otherwise caused to adhere to the rubber portions $a$ and $c$, and the fabric portions $e$ and $h$ are cemented or otherwise caused to adhere together and to the rubber portion $c$ in the usual manner, and the entire tire is vulcanized after the parts have been put together.

An air-valve is employed for inflating the tire, and it is to be inserted through the felly and through an opening in the under face of the inflatable tire—such an air-valve, for instance, as is set forth and illustrated in my application for Letters Patent filed June 17, 1891, Serial No. 396,540.

The completed inflatable tire is to be sprung over the hollow felly and the flanges $d\ d'$ bent or sprung inwardly to place with the cores $f\ f'$ seated in the grooves $l\ l'$ and held in place by clamping-rings $o\ o'$, that are connected to the convex inner side of the felly. I have shown two ways of connecting these rings. The ring $o'$ is connected by screws $r$ to the felly, while the ring $o$ is connected by the rivet studs and eyes $s$ and is slipped or sprung into place. In either instance the free outer end of the rings impinges slightly against the flanges d d' sufficiently to make a tight joint and prevent mud or water working beneath the rings o o'.

With my improved tire to replace a spoke and insert a new nipple or to repair the felly it is only necessary to remove the clamping-rings o o' and release the flanges d d' and spring the entire inflatable tire and its flanges off the felly, and the same is as easily replaced again. The flanges d d' and their cores or wires f f' are preferably in sections or divided into any convenient number of parts, so as to facilitate removing the tire from the form on which it is made and placing it upon the wheel-felly.

I claim as my invention—

1. An inflatable or pneumatic tire for bicycles, &c., composed of an inner rubber tube, a seamless inclosing sleeve of fabric cemented thereon, a strip of fabric e at the inner or felly side of the tire and rubber for cementing the same in place, and an outer covering of rubber including the tread portion and cemented upon the sleeve and upon the strip of fabric, the rubber being vulcanized, substantially as specified.

2. An inflatable or pneumatic tire for bicycles, &c., composed of an inner rubber tube, a seamless inclosing sleeve of fabric cemented thereon, a strip of fabric e at the inner or felly side of the tire and rubber for cementing the same in place, and an outer covering of rubber with a thicker tread portion that comes in contact with the ground, said outer covering being cemented upon the sleeve and upon the strip of fabric, the rubber being vulcanized, substantially as specified.

3. An inflatable or pneumatic tire for bicycles, &c., composed of an inner rubber tube, a seamless inclosing sleeve of fabric cemented thereon, a strip of fabric e at the inner or felly side of the tire and rubber for cementing the same in place, and an outer covering of rubber with a thicker tread portion and cemented upon the sleeve and upon the strip of fabric and having flanges extending inwardly and by which the tire is to be attached, the rubber being vulcanized, substantially as specified.

4. An inflatable or pneumatic tire for bicycles, &c., composed of an inner rubber tube a, a seamless inclosing sleeve b therefor of fabric, an outer covering c of rubber, and strips of fabric h e therein, the flanges d d', formed from continuations of the covering c and fabric e, and the cores f f', inclosed in said flanges, substantially as and for the purposes set forth.

5. The combination, with an inflatable or pneumatic tire for bicycles having integral flanges and cores formed therewith, of a hollow felly having circumferential grooves in the inner face, adapted to receive the cores of the flanges, and clamping-rings for securing the flanges and cores within the grooves and holding the tire to the felly, substantially as specified.

6. The hollow felly composed of a slightly-concave outer plate, an inner convex plate having circumferential grooves in the surface thereof and said plates interlocked at their edges, in combination with an inflatable or pneumatic tire for bicycles, having integral flanges and cores, said cores being received in the grooves in the inner surface of the felly, and the clamping-rings for securing the flanges and cores within the grooves and holding the tire to the felly, substantially as specified.

Signed by me this 29th day of June, A. D. 1891.

E. R. DE WOLFE.

Witnesses:
GEO. T. PINCKNEY,
HAROLD SERRELL.